Figure 1:
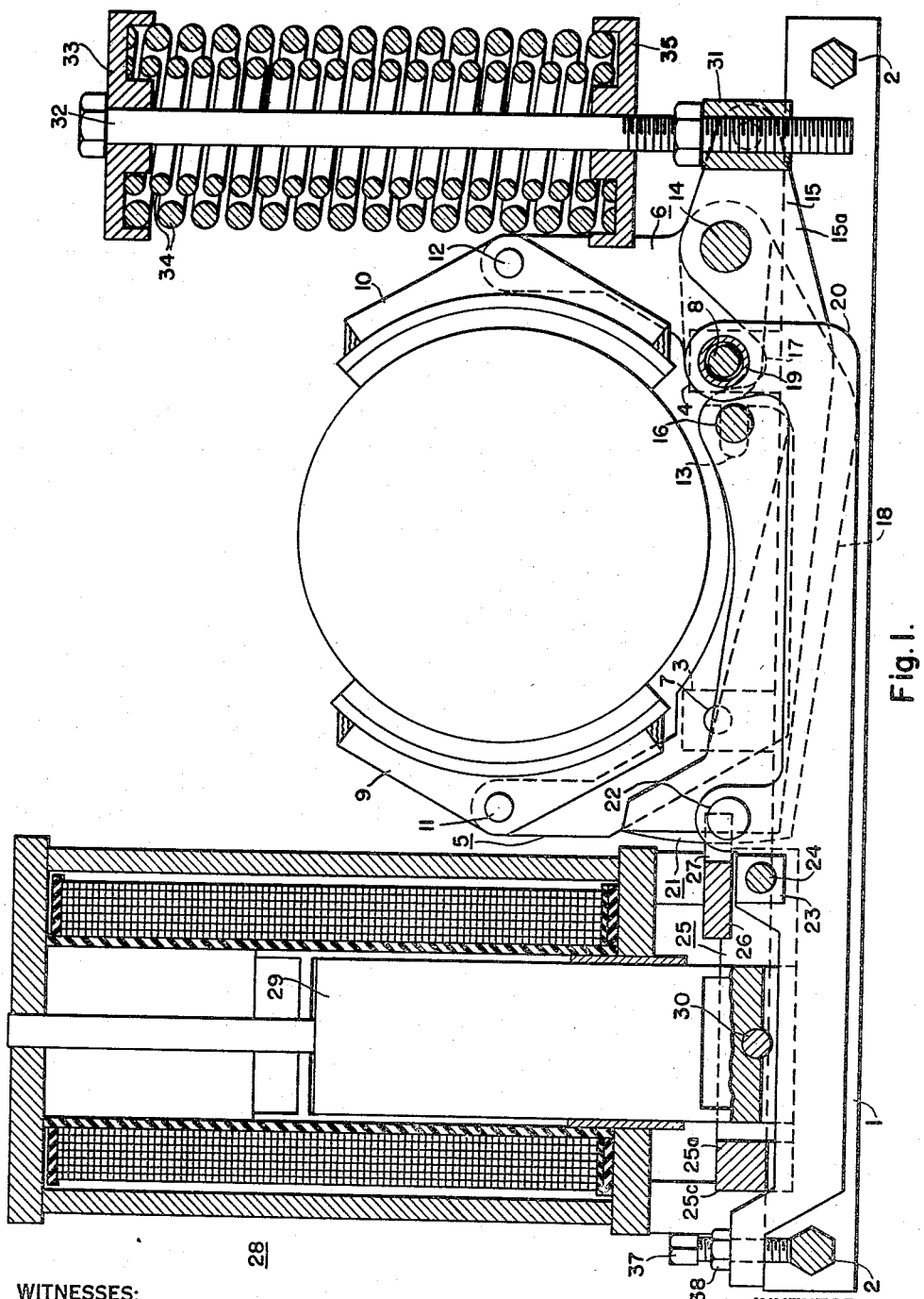

Aug. 10, 1954    G. CURRIE    2,685,945
SELF-ADJUSTING BRAKE
Filed Oct. 3, 1951    3 Sheets-Sheet 1

Fig. I.

WITNESSES:
Wm. B. Sellers.
E. F. Oberheim

INVENTOR
Gilbert Currie.
BY
Paul E. Friedemann
ATTORNEY

Aug. 10, 1954         G. CURRIE         2,685,945
SELF-ADJUSTING BRAKE

Filed Oct. 3, 1951         3 Sheets-Sheet 3

WITNESSES:
Wm. B. Sellers.
E. F. Oberheim

INVENTOR
Gilbert Currie.
BY Paul E. Friedemann
ATTORNEY

Patented Aug. 10, 1954

2,685,945

UNITED STATES PATENT OFFICE 2,685,945

SELF-ADJUSTING BRAKE

Gilbert Currie, Williamsville, N. Y., assignor to Westinghouse Electric Corporation, East Pittsburgh, Pa., a corporation of Pennsylvania Application October 3, 1951, Serial No. 249,496

9 Claims. (Cl. 188—75)

This invention relates generally to brakes and is particularly directed to a brake which compensates brake lining wear, misalignment of parts, and requires no adjustment throughout the life of the brake lining.

In certain of its general aspects, this invention is related to the applicant's Patent 2,514,378, dated July 11, 1950, and assigned to the assignee of this invention. In certain of its detailed aspects, this invention represents an improvement in the subject mater disclosed and claimed in the patent aforesaid.

In the drawing this invention is illustrated in connection with an electric brake of the double block type, in which a spring applies the braking torque and a solenoid operating against the spring or braking torque lifts the brake shoes from the member to be braked.

In the usual case, double block brakes include a brake wheel and have brake arms on opposite sides of the brake wheel, which brake arms carry the brake shoes at their free extremities. The brake is set by a compression spring and link system connecting the free extremities of the brake arms. This compression spring and link system forces the brake arms together to engage the shoes with the brake wheel. The brake is released, in most instances, by means of a bell crank having its middle fulcrum on the brake arm extremity adjacent the compression spring, and one end thereof attached to the link. Forces applied in the proper direction to the remaining end of the bell crank drive the free extremities of the brake arms apart and release the brake. Frequently on double block brakes the bell crank is actuated by a solenoid.

Most brakes of this general type have three adjustments; one for varying the torque, and hence braking and releasing effort by varying the amount of spring compression; one for equalizing the shoe clearances, usually by means of separate adjustments on the shoes; and the third for adjusting the stroke or travel of the solenoid plunger.

While these adjustments may vary for different types of brakes, they are essentially the same. In the typical case, after the brake is mounted in position, it is necessary to make most and usually all of these adjustments, and the successful operation of the brake depends upon the skill with which the adjustments are made. The initial adjustments, however, hold only for the initial thickness of the brake shoe lining. As the brake is used and the linings are worn, the brake is continuously moving out of adjustment. When the lining has worn an amount equal to the initial shoe clearances, the solenoid plunger travel has doubled and it is necessary to readjust the brake to restore the travel to its original amount. If the adjustments are not made at the proper time or are not properly made, brake failures, evidenced in excessive heating and burned-out solenoid coils, may result.

Generally, it is one object of this invention to provide a brake of the class described in which the probability of brake failure is substantially reduced.

It is also an object of this invention to provide a brake which requires no adjustment when once initially adjusted and put into operation.

Another object of this invention is to provide a brake of the class mentioned in which automatic compensation for brake lining or brake shoe wear is had.

Yet another object of this invention is to provide a brake in which the travel of the operating mechanism for the brake remains constant, irrespective of movement of the brake shoes and arms with wear.

Still another object of this invention is to provide a brake in which automatic compensation for misalignment of the brake wheel with respect to the center line of the brake is had.

And still another object of this invention is to provide a brake in which wear at the point of pivoting of the brake arms is compensated and does not affect the brake operation.

A further object of this invention is to provide a brake in which the forces acting on the brake arms at the points of pivoting thereof are in substantially the same direction whether the brake is on or off.

Yet a further object of this invention is to provide a brake which is efficient in operation without adjustment throughout the life of a given set of brake lining.

A still further object of this invention is to provide a brake which is simple in its elements with respect to operational requirements, consistent in its operation, and economical to build.

In the aforesaid patent there is disclosed a brake which embodies a pair of levers, one of which is connected to both of the brake arms which actuate the brake shoes and the other of which is connected, for limited angular movement, to but one of the brake arms. A spring is connected to the first mentioned of the levers in such a way as to rotate this lever that the brake arms are moved in a direction to apply the brake shoes against the brake wheel. The two levers occupy positions in side-by-side relation and terminate in arcuate sections at their free extremities. A pawl lever is pivotally connected to the frame of the brake and has a pawl pivotally mounted thereon. The pawl in turn is pivotally connected to a suitable actuating means such as an armature or plunger of an electromagnet or solenoid.

The end of the pawl adjacent the arcuate extremities of the two levers when the electromagnet is de-energized occupies a position in spaced relation with respect to the mentioned arcuate extremities. In this position of the pawl, the levers are completely disconnected from the releasing mechanism and are therefore free to move with respect to the pawl and to move angularly with respect to each other due to movement of the brake arms with brake lining wear and brake wheel misalignment with respect to the brake center line. The spacing between the arcuate surfaces and the cooperating surfaces of the pawl does not change with the movement described. Consequently, the actuating mechanism, such as the mentioned armature or plunger, moves only a predetermined distance to engage the levers and move them as a unit to brake released position. By reason of the arrangement of the pawl lever with respect to the other levers of the mechanical linkage therein disclosed, and in view of certain asymmetrical arrangements of the mechanical linkages, clutch pressures at the pawl and certain bearing pressures were unnecessarily high, and it is to such features which this invention is directed.

Accordingly, it is another object of this invention to provide mechanical linkage in a brake of the class hereinabove specifically described wherein clutch pressures in the brake releasing mechanism are kept at a minimum value.

And it is also an object of this invention to provide a symmetrical arrangement of levers in a brake of the class hereinabove specifically described, wherein bearing pressures may be minimized.

Figure 2:
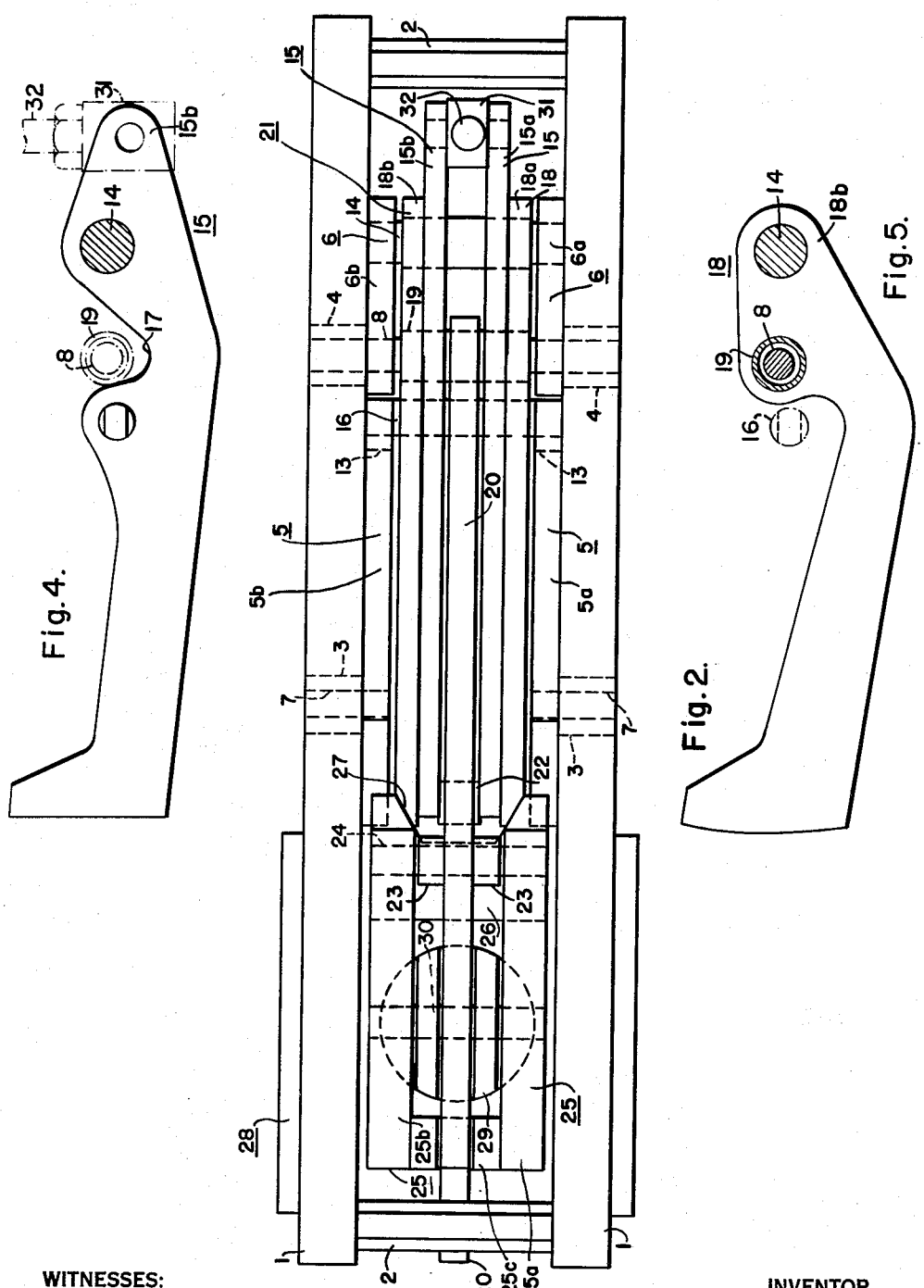
Figure 3:
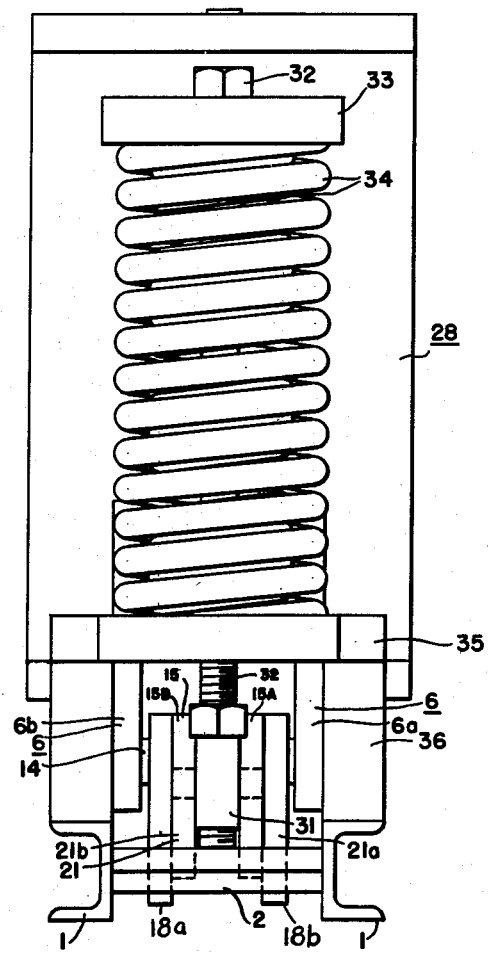
Figure 6:
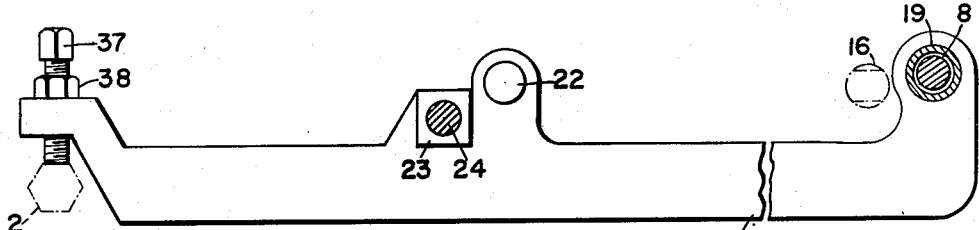

The foregoing statements are merely illustrative of the various aims and objects of this invention. Other objects and advantages will become apparent upon a study of the following specification when considered in conjunction with the accompanying drawing, in which:

Figure 1 is a side view fragmentarily in section of a brake embodying the principles of this invention, Fig. 2 is a bottom view of the brake illustrated in Fig. 1, Fig. 3 is a view of the right end of the brake, and Figs. 4, 5 and 6 are details of the respective lever assemblies.

Referring to the drawing, the brake assembly is supported on a base section which comprises a pair of base bars designated 1. These bars are spaced apart as illustrated in Fig. 2, and are rigidly secured in this spaced relation by means of spacers 2 which may be welded, bolted, or otherwise suitably secured to the respective base bars. The base bars are provided with oppositely disposed pairs of bearing blocks 3 and 4, which pairs are secured in longitudinally spaced relation along the base. Brake arm assemblies 5 and 6 are pivotally mounted by the respective pins 7 and 8 in the respective pairs of bearing blocks. The brake arm assemblies, as will be seen from reference to Fig. 2, are comprised of pairs of spaced levers 5a, 5b and 6a, 6b, respectively. Pin 8 extends completely across the brake frame between the bearing blocks. However, the pin 7 comprises two stub sections which are secured in the respective bearing blocks and project between the frames only a distance sufficient to pivotally mount the respective pairs of arms 5a, 5b comprising the brake arm 5. Brake shoes 9 and 10 are mounted by means of pins 11 and 12 between the free extremities of the respective brake arm assemblies 5 and 6 and are sufficiently frictionally restrained to prevent their movement about their points of pivotal mounting due to their weight, once the brake shoes have been adjusted with respect to the brake wheel.

Brake arms 5a and 5b at their remaining extremities are provided with horizontal slots 13 opening through the end thereof. Brake arms 6a and 6b, at a point displaced from both of pins 8 and 12 and at a point displaced in the same direction from the axis of pin 8 as the slots 13 in brake arm assembly 5 are displaced from the axis of pin 7, are engaged by a pin 14 which extends between the respective arms and is carried by a lever assembly 15 providing a pivotal connection between brake arm 6 and lever assembly 15. Lever assembly 15, comprising two lever sections 15a and 15b which are similar in shape and which are disposed in spaced side-by-side relationship, is provided with a second pin, 16, the ends of which project beyond the outer faces of the respective lever sections and which are flattened on both the top and bottom sides thereof to slide between the confronting edges of the slots 13. As will be observed by reference to Figs. 1 and 4, the lever sections of lever assembly 15 are cut away at 17 to pass beneath the pin 8 which pivotally mounts the brake arm assembly 6. Pins 14 and 16 therefore effectively provide points of pivotal connection of lever assembly 15 to both brake arm assemblies 5 and 6.

A second lever assembly 18, the shape of which is more clearly seen in Fig. 5, comprises two lever sections 18a and 18b which are respectively disposed adjacent the respective outer faces of lever sections 15a and 15b. The right ends of lever sections 18a and 18b, respectively, are pivotally mounted about pin 14 in the lever assembly 15. A sleeve 19 having an inner diameter greater than the diameter of brake arm pivot pin 8 is loosely fitted over the pivot pin 8 and engages both of the lever sections 18a and 18b. Thus lever assembly 18 is pivotally mounted on the lever assembly 15 for limited angular movement about the pin 14. The movement being limited angularly to the difference in diameter between the brake pivot pin 8 and the inner diameter of sleeve 19. A pawl lever 20, detailed in Fig. 6, which is substantially L-shaped at its right-hand end is fitted about sleeve 19 in a position between the lever sections 15a and 15b. As seen in Fig. 1, the right-hand end of lever 20 projects downwardly from pivot pin 8 and passes beneath the pin 16 carried by lever assembly 15.

Lever assemblies 15 and 18 and lever 20 extend to the left as viewed in each of the figures of the drawing to a position beyond the point of pivoting of brake arm assembly 5. At this point, the lever sections 18a and 18b terminate in a beveled arcuate section 21, the end face of which is an arc having its center substantially at the center of pivot pin 8 of brake arm assembly 6. The ends of lever sections 15a and 15b occupy positions slightly to the right of the arcuate sections 21. At a point between the ends of lever sections 15a and 15b, a friction pad 22 is inserted through the lever 20; the ends of this pad 22 are suitably faced and are positioned adjacent to the inner faces of lever sections 15a and 15b.

At a point to the left of friction pad 22, bosses 23 are mounted on the lever 20. These bosses are drilled to receive a pin 24 which passes therethrough. The ends of pin 24 pivotally mount the right-hand end of a pawl link 25, comprised of two lever sections, 25a and 25b, which are joined by a transverse section 25c at their left extremities. Pawl link 25 is provided with a clutch piece 26, which straddles the lever sections 25a and 25b of the pawl at the right-hand end of the pawl. A V-shaped notch 27 is provided in the face of the clutch piece 26, the sloping faces of which correspond exactly to the taper of the arcuate sections 21 of lever sections 18a and 18b, and the notch is sufficiently wide to straddle the cooperating faces of the arcuate sections 21.

With the assembly thus far described, when the solenoid 28 is in its de-energized position as illustrated, a slight clearance is provided between the cooperating faces of the clutch piece 26 and the arcuate sections of the lever sections 18a and 18b. When the solenoid is energized, the pawl link 25 is lifted upwardly by reason of the connection of the bottom end of the solenoid plunger 29 to the pawl by means of the pin 30. During the first part of the movement of the solenoid plunger, only the pawl link 25 is actuated. As a consequence, clockwise angular movement of the pawl about pin 24 occurs, driving the faces of clutch piece 26 into engagement with the cooperating faces of arcuate sections 21. In view of the degree of taper of the cooperating faces, the lever sections 18a and 18b are thrust inwardly, as viewed in Fig. 2, toward the longitudinal center line of the brake, frictionally engaging lever sections 18a and 18b with lever sections 15a and 15b, which latter, in turn, are frictionally engaged with the end faces of friction pad 22, locking the lever sections together as a unit. Continued movement of the plunger at this time then results in movement of the complete lever assembly as a single unit. The direction of angular movement of the entire lever assembly is clockwise, as seen in Fig. 1.

During the first portion of movement of the entire lever assembly in the mentioned clockwise direction, the lever system pivots about the pin 14 of brake arm assembly 6, driving the right-hand end of lever assembly 15 downwardly. This right-hand end of lever assembly 15 is pivotally connected by a spring bolt trunnion pin 31 to a spring bolt 32 connected at its upper end to a spring washer 33 engaging the upper end of concentric spring assembly 34, the bottom end of which is secured by spring washer 35, in turn secured to base bars 1 by supports 36. This clockwise angular movement therefore works against the compression of the spring assembly 34. During this movement, pin 16, carried by lever assembly 15, is moved upwardly as viewed, and rotates brake arm assembly 5 in a counterclockwise direction. Pivotal movement continues about pin 14 until the slack in the loose connection of lever sections 18a and 18b to brake pivot pin 8 is taken up, at which time the point of pivoting shifts from the pin 14 to the pin 8. Continued clockwise movement of the lever assembly then moves pin 14 downwardly, disengaging brake shoe 10 from the brake wheel.

With the lever system herein described, compensation for misalignment of the brake wheel with respect to the center line of the brake is compensated. For example, consider the situation in which the brake wheel is moved to the right of the position herein illustrated. For this discussion, consider the solenoid de-energized. Both brake shoes now bear against brake wheel. As the brake wheel is moved to the right from the position illustrated, brake arm assembly 5 moves clockwise and brake arm assembly 6 also moves clockwise. In effect, brake arm assembly 5 follows the clockwise rotation of brake arm 6 when the brake which is displaced to the right because of its connection by pin 16 to lever assembly 15. When brake arm 5 is rotated clockwise as described, pin 14 moves down, driving lever assembly 15 counter-clockwise about trunnion pin 31. Consequently pin 16 on lever assembly 15 moves downwardly in an arcuate path about trunnion pin 31, driving brake arm 5, which it engages, clockwise. The left-hand end of lever assembly 15 moves downwardly with respect to lever assembly 18, and with respect to lever assembly 20. If the solenoid is now energized, the several lever assemblies are frictionally engaged in this new angular relationship and again moved as a single unit. As a consequence, the same amount of travel is required for this new condition of misalignment as was required for perfect alignment to obtain the same amount of shoe clearance with respect to the brake wheel.

As the brake is used and the brake lining wears, the brake shoes move towards each other, resulting in clockwise movement of brake arm assembly 5 and counterclockwise movement of brake arm assembly 6. Pin 16 moves down and pin 14 moves up, as viewed in Fig. 1, resulting in counterclockwise rotation of lever assembly 15. At the same time, due to the counterclockwise tilting of brake arm assembly 6, lever assembly 18 is rotated in a counterclockwise direction, but in an amount different from that of lever assembly 15, and its left end drops. However, in this instance again, movement of the left-hand end occurs substantially about the center of the arcuate section 21 and consequently no change in spacing between this arcuate section and the cooperating faces of clutch 26 occurs. Consequently, in this instance again, to obtain brake release and equal shoe clearance in brake release position, the same amount of solenoid plunger travel is required as for the previously considered situations. Movement of pawl lever 20 in a counterclockwise direction is limited at its left-hand extremity by means of an adjusting screw 37 which threads therethrough and is locked by a lock nut 38. The bottom end of this screw bears against the spacer 2 at the left-hand end of the brake base.

The expedient of pivotally mounting the pawl lever 20 about the brake arm pivot pin 8 or, alternatively, substantially adjacent the axis of the brake arm pivot pin 8, measurably improves the operational properties of the assembly. In earlier designs this pawl lever 20 was pivotally mounted about an axis corresponding approximately to the axis of pivot pin 7. As a consequence considerable displacement between the arcuate ends 21 of the lever assembly 18 and the clutch piece face 27 occurred during the plunger stroke. Such movement necessitated appreciable pressures in the clutch faces to maintain secure frictional engagement of the relatively moving parts and resulted in a high rate of wear. In the present design, since there is no angular movement between the pawl lever 20 and lever assemblies 15 and 18 throughout the plunger stroke, it is possible to use the friction between the lever sections 15a and 15b and the friction plug 22, as well as the friction between the clutch piece 26 and the cooperating faces of the lever sections 18a and 18b, thus doubling the friction surfaces in contact and making it possible to reduce by one-half the pressure between the clutch piece 26 and the lever sections 18a and 18b.

Also, since the lever sections 18a and 18b pivot on bushing 19, which is secured in the end of pawl lever 20, the force tending to move levers 18 to the right, due to the pressure of clutch piece 26, is balanced by the force tending to move the pawl lever 20 to the left, which force is applied to the pawl lever through the pawl pivot pin 24. These forces are balanced in the bushing 19 so that there is no loading on the pin 8 due to these forces. Additionally, by dividing the lever assemblies 15 and 18 into the illustrated sections which are symmetrically disposed, the bending stresses on pins 8 and 14 are reduced.

In this design, the various objects are yet achieved importantly that of producing a brake having a system of levers so designed that they are free to move into a position depending on the position of the brake shoes held against a brake wheel by the force of a spring system, while still maintaining a constant relationship to a friction clutch, due to the fact that the faces of the lever system against which the clutch engages move radially about a relatively fixed point. This clutch, which is operated by an actuator such as a solenoid, therefore engages the lever system into the equivalent of a single unit during brake releasing movements, and the arrangement is operative to free the brake shoes from the wheel, using the same amount of travel for the actuator regardless of the wear of the brake lining and without need for adjustment to keep the shoe clearance on each shoe constant during the life of the brake. In short, a self-adjusting brake is provided which is self-compensating for inaccuracy in locating the brake with respect to the brake wheel and for wearing of the brake shoe lining.

In order to maintain the torque rating of the brake nearly constant during the wear of the brake lining from new lining to completely worn lining, a compression spring assembly is used, having a total compression such that the variation in spring length from new lining to completely worn lining will be less than 10 per cent of the total spring compression, in which case the variation in torque rating will be less than 10 per cent.

The foregoing disclosure and the showings made in the drawing are merely illustrative of the various aims and objects of this invention, and are not to be interpreted in a limited sense.

I claim as my invention:

1. A brake assembly for controlling rotative movement of a brake wheel comprising, a pair of brake shoes for engaging the brake wheel, a pair of pivotally mounted brake arms, said brake shoes being pivotally attached to said brake arms, a first lever pivotally connected to said brake arms at points on said brake arms removed from the points of pivoting thereof, means for biasing said first lever in one direction to move said brake arms to apply said brake shoes against said wheel, a second lever pivotally connected for limited angular movement with one of said brake arms, a brake releasing lever pivotally mounted about the pivot axis of said one brake arm, and operating means connected with said brake releasing lever for engaging said levers at points displaced from said one brake arm and moving said levers as a unit in a direction opposite to said one direction.

2. A brake assembly for controlling rotative movement of a brake wheel comprising, a pair of brake shoes for engaging the brake wheel, a pair of pivotally mounted brake arms, said brake shoes being pivotally attached to said brake arms, a first lever pivotally connected to said brake arms at points on said brake arms removed from the points of pivoting thereof, means for biasing said first lever in one direction to move said brake arms to apply said brake shoes against said wheel, a second lever pivotally connected on one brake arm and loosely connected with said one brake arm at a second point, a brake releasing lever pivotally connected with said second lever substantially at the point of loose connection of said second lever with said one brake arm, and operating means connected with said brake releasing lever for engaging said levers at points displaced from said one brake arm and moving said levers as a unit in a direction opposite to said one direction.

3. A brake assembly for controlling rotative movement of a brake wheel comprising, a pair of brake shoes for engaging the brake wheel, a pair of pivotally mounted brake arms, said brake shoes being pivotally attached to said brake arms, a first lever pivotally connected to said brake arms at points on said brake arms removed from the points of pivoting thereof, means for biasing said first lever in one direction to move said brake arms to apply said brake shoes against said wheel, a second lever pivotally connected for limited angular movement with one of said brake arms, a brake releasing lever pivotally mounted about the axis of pivoting of said one brake arm, said levers being disposed in side-by-side relation along a section of their length, and operating means connected with said brake releasing lever for engaging said levers at said section and thereafter moving said levers as a unit in a direction opposite to said one direction.

4. A brake assembly for controlling rotative movement of a brake wheel comprising, a pair of brake shoes for engaging the brake wheel, a pair of pivotally mounted brake arms, said brake shoes being pivotally attached to said brake arms, a first lever pivotally connected to said brake arms at points on said brake arms removed from the points of pivoting thereof, means for biasing said first lever in one direction to move said brake arms to apply said brake shoes against said wheel, a second lever pivotally connected on one brake arm and loosely connected with said one brake arm at a second point, a brake releasing lever pivotally connected to said second lever substantially at the point of loose connection of said second lever with said one brake arm, said levers being disposed in side-by-side relation along a section of their length, and operating means connected with said brake releasing lever for engaging said levers at said section and thereafter moving said levers as a unit in a direction opposite to said one direction.

5. A brake assembly for controlling rotative movement of a brake wheel comprising, a brake wheel, a pair of brake shoes for engaging the brake wheel, a pair of brake arms, a pivot pin for each brake arm pivotally mounting the respective brake arms, said brake shoes being pivotally attached to said brake arms, a first lever pivotally connected to each brake arm at a point thereon removed from the pivot pin thereof, means for biasing said first lever in one direction to move said brake arms to apply said brake shoes against said wheel, a second lever pivotally connected to one brake arm substantially at the point of pivotal connection of said first lever to said one brake arm, said second lever being also loosely connected about the pivot pin of said one brake arm, a third lever pivotally connected to said second lever substantially at the point of loose connection of the second lever with said pivot pin, said levers being disposed in side-by-side relation along a portion of their length, and operating means pivotally connected with said third lever for engaging said levers at said portion and moving said levers as a unit in a direction opposite to said one direction.

6. A brake assembly for controlling rotative movement of a brake wheel comprising a brake wheel, a pair of brake shoes for engaging the brake wheel, a pair of brake arms, a pivot pin for each brake arm pivotally mounting the respective brake arms, said brake shoes being pivotally attached to said brake arms, a first lever pivotally connected to each brake arm at a point thereon removed from the pivot pin thereof, means for biasing said first lever in one direction to move said brake arms to apply said brake shoes against said wheel, a second lever pivotally connected to one brake arm substantially at the point of pivotal connection of said first lever to said one brake arm, a sleeve loosely disposed about the pivot pin of said one brake arm, said second lever being connected to said sleeve, a third lever pivotally connected to said sleeve, said levers being disposed in side-by-side relation along a portion of their length, and operating means pivotally connected to said third lever adjacent said portion for engaging said levers at said portion and moving said levers as a unit in a direction opposite to said one direction.

7. A brake assembly for controlling rotative movement of a brake wheel comprising a brake wheel, a pair of brake shoes for engaging the brake wheel, a pair of brake arms, a pivot pin for each brake arm pivotally mounting the respective brake arms, said brake shoes being pivotally attached to said brake arms, a first lever pivotally connected to each brake arm at a point thereon removed from the pivot pin thereof, means for biasing said first lever in one direction to move said brake arms to apply said brake shoes against said wheel, a second lever pivotally connected to one brake arm substantially at the point of pivotal connection of said first lever to said one brake arm, said second lever being also loosely connected about the pivot pin of said one brake arm, a third lever pivotally connected to said second lever substantially at the point of loose connection of the second lever with said pivot pin, said levers being disposed in side-by-side relation along a portion of their length, a pawl lever pivotally connected to said third lever, actuating means connected with said pawl lever at a point thereon displaced from the point of pivotal connection of the pawl lever to said third lever, and gripping faces on said pawl lever for engaging said levers at said portions upon angular movement of the pawl lever with respect to said third lever, said levers being frictionally engaged one with the other to move as a unit with said actuating means.

8. A brake assembly for controlling rotative movement of a brake wheel comprising a brake wheel, a pair of brake shoes for engaging the brake wheel, a pair of brake arms, a pivot pin for each brake arm pivotally mounting the respective brake arms, said brake shoes being pivotally attached to said brake arms, a first lever pivotally connected to each brake arm at a point thereon removed from the pivot pin thereof, means for biasing said first lever in one direction to move said brake arms to apply said brake shoes against said wheel, a second lever pivotally connected to one brake arm substantially at the point of pivotal connection of said first lever to said one brake arm, a sleeve loosely disposed about the pivot pin of said one brake arm, said second lever being connected to said sleeve, a third lever pivotally connected to said sleeve, said levers being disposed in side-by-side relation along a portion of their length, a pawl lever pivotally connected to said third lever, actuating means connected with said pawl lever at a point thereon displaced from the point of pivotal connection of the pawl lever to said third lever, and gripping faces on said pawl lever for engaging said levers at said portions upon angular movement of the pawl lever with respect to said third lever, said levers being frictionally engaged one with the other to move as a unit with said actuating means.

9. A brake assembly for controlling rotative movement of a brake wheel, comprising, a brake wheel, a pair of brake shoes for engaging the brake wheel, a pair of brake arms, a pivot pin for each brake arm pivotally mounting the respective brake arms, said brake shoes pivotally attached to the respective brake arms, a first lever assembly comprising a pair of similar levers arranged in spaced side-by-side relation, a pair of pivot pins in said first lever respectively connected to said respective brake arms at points on said brake arms displaced from the pivot pins therefor, said first lever assembly having one end thereof projecting beyond one brake arm, spring means connected to said one end of said first lever assembly for biasing said first lever assembly in one direction to apply said brake shoes to said wheel, a second lever assembly comprising a pair of levers respectively disposed beside the respective outer faces of the pair of levers of said first lever assembly, each lever of said second lever assembly being pivotally connected to said one brake arm and being loosely connected about the pivot pin about which said one brake arm pivots, the remaining ends of the pair of levers of said second lever assembly terminating in arcuate surfaces having their centers of curvature substantially at the axis of said loose connection, said arcuate surfaces occupying positions substantially adjacent the remaining ends of the levers of said first lever assembly, a third lever pivotally connected with respect to said second lever about an axis substantially coinciding with the axis of loose connection of said second lever assembly, said third lever being disposed between the levers of said first lever assembly and extending beyond said remaining ends of both lever assemblies, a pawl lever pivotally connected to said third lever, a pawl having a V-shaped notch mounted on said pawl lever, said V-shaped notch straddling said levers of said second lever assembly, means for actuating said pawl lever angularly with respect to said third lever, said pawl at said V-shaped notch engaging said arcuate faces and pressing said levers together and moving said levers as a unit in a direction opposite to said one direction.

References Cited in the file of this patent

UNITED STATES PATENTS

| Number | Name | Date |
|---|---|---|
| 2,514,378 | Currie | July 11, 1950 |